INVENTOR.
Graham H. Johnson

Nov. 6, 1962

G. H. JOHNSON 3,062,974

SURGE GENERATOR

Filed Sept. 11, 1958

INVENTOR.
Graham H. Johnson
BY Lee H. Kaiser
Attorney

United States Patent Office 3,062,974
Patented Nov. 6, 1962

3,062,974
SURGE GENERATOR
Graham H. Johnson, Zanesville, Ohio, assignor to Mc-
Graw-Edison Company, Milwaukee, Wis., a corporation of Delaware
Filed Sept. 11, 1958, Ser. No. 760,335
9 Claims. (Cl. 307—108)

This invention relates to high voltage surge generators and their method of operation and in particular to surge generators having a plurality of gap devices which sparkover sequentially to initiate the discharge of the generator.

Impulse tests are necessary to demonstrate the ability of an electrical transformer to withstand high transient voltages that occur in service. One conventional impulse test includes the step of applying a voltage impulse to one terminal of a high voltage transformer winding while the other terminal of the same winding, the center tap terminal of the low voltage winding, and the tank are grounded. The standard waveform for the impulse is such that the wave front rises to crest in one and one-half microseconds and the tail of the wave decays to half-crest in forty microseconds. The crest voltage of the wave depends upon the voltage rating of the winding being tested and is prescribed by industry standards.

A common form of high voltage surge generator used in the impulse testing of transformers is one involving a series-parallel arrangement of condensers commonly known as a Marx circuit and by means of which a high voltage impulse wave may be derived from a comparatively low voltage source. The Marx surge generator circuit multiplies the voltage of the power source by charging the condensers in parallel from a rectifier through high resistances and discharging them in series through spark gaps which isolate the condensers during charging. The condensers are arranged in steps with the charging resistors connected between steps to give an accumulative voltage equal to the sum of the individual condenser voltages, and the sparkgaps connected across the steps are flashed over to initiate the generator discharge and connect the condenser in series.

The output voltage from the surge generator is converted to a standard 1½ x 40 microsecond wave by means of a shunt resistance that causes the tail of the wave to decay and a series impedance that, in cooperation with a shunt capacitane, delays the time to crest. The output of the wave shaping circuit is connected to the test piece, and the proper values for the wave shaping circuit elements to obtain a 1½ x 40 microsecond wave depend upon the characteristics of both the generator and the test piece. When the test piece is a transformer, the proper values of wave shaping circuit elements may also depend upon the method of fault detection employed if maximum fault detection sensitivity is to be achieved.

Although the sparkover of the spaced gap-electrodes is usually considered to be simultaneous, it is preferable that the sparkgaps flashover in a predetermined sequence. In laboratory testing of electrical transformers, the crest voltage amplitude of the impulse is conventionally adjusted by varying both the charging voltage and the spacing of the individual sparkgaps. Such calibration of all of the sphere gap electrodes is disadvantageous in the production line impulse testing of electrical transformers where successive transformers on the production line may be of different voltage classes.

A second method of adjusting the output voltage of a Marx circuit surge generator comprises setting the sparkgaps so that they will just sparkover for a charging voltage whose amplitude will yield the desired generator output voltage. In this method the charging voltage is deliberately set too high so that, as the capacitors gradually become charged, the generator fires automatically when the desired charging level has been reached. A third method of adjusting surge generator output voltage consists of permanently adjusting the charging voltage and the sparkgaps and then employing taps on the wave shaping shunt resistance in the manner of a voltage divider to obtain the desired voltage output.

All of these methods have the disadvantage that gap setting is a rather critical operation and that a marked change in atmospheric conditions may require a change in gap setting. The first method is too time consuming to be practicable for production line impulse testing since each change of charging voltage must be accompanied by re-calibration of the spacing of all of the gaps. The second method is even slower, since experimental discharges may be required for adjusting the gaps to a spacing that will give the desired output voltage. The third method is the fastest but has the disadvantage that a change of tap connections on the shunt resistance effectively varies the series impedance of the wave shaping circuit and may thus change the wave shape of the surge impulse. All of these prior art methods have the further disadvantage that adverse atmospheric conditions may cause accidental discharge of the surge generator, which may be dangerous to life, or cause a fault to occur in the apparatus being tested when the fault detecting apparatus is inoperative.

It is an object of the invention to provide an improved surge generator and method of operation therefor which eliminate or substantially reduce the following disadvantages of prior art devices: (a) adverse effects of atmospheric variations upon generator performance; (b) loss of time resulting from re-calibration of sparkgap spacing; (c) adverse effect upon the waveform of the test impulse resulting from variations in the series impedance of the wave shaping circuit; and (d) undesirable effects from the generator firing at the wrong time or at the wrong voltage as a result of imperfect gap setting.

It is a further object of the invention to provide an improved surge impulse generator and method of operation therefor which does not require adjustment of the sparkgap spacing in order to accomplish a change in output voltage.

Another object of the invention is to provide an improved method of operating a Marx circuit surge generator which obviates the necessity of re-calibrating sparkgap spacing and permits sequential delivery, with a minimum time interval therebetween, of impulses of different magnitude but of the same waveform and of accurately calibrated potential.

It is a still further object of the invention to provide a Marx circuit surge generator having means to simultaneously decrease the spacing of all of the sparkgaps while maintaining a predetermined ratio between the gap spacings and means to initiate such closing of the sparkgaps after the capacitors are at least partially charged.

A relatively long time interval is required to charge the condensers of a conventional Marx circuit surge generator to the full charge required to provide an impulse wave of predetermined magnitude because the charge on the capacitors tends to bias the rectifiers to cutoff and also because the high resistances through which the condensers are charged result in a relatively long time constant. In conventional surge impulse generators the charging of the condenser to peak voltage often requires a time interval which is impracticable for production line impulse testing.

It is another object of the invention to provide a high voltage surge generator adapted to deliver successive surge impulses of accurately calibrated magnitude with an interval between impulses less than that required to charge the condensers to peak voltage. It is a further object to provide such a surge generator which is capable of rapidly delivering successive, accurately calibrated, surge impulses of different predetermined magnitudes but of the same waveform.

In my copending application Serial No. 760,509, filed September 11, 1958, entitled "Impulse Testing Apparatus" and having the same assignee as the subject application, a production line impulse testing apparatus is disclosed wherein the output from a reduced voltage surge generator is first discharged through the test piece and the resulting wave in the test piece displayed on a long persistence oscilloscope screen and a full voltage surge generator is then discharged through the test piece and displayed on the same screen. Voltage divider means are switched in the circuit between the reduced and full voltage impulses so that the indications thereof are of the same magnitude and superimposed on the oscilloscope screen if no fault has occurred in the test piece. This provides a reference image to the operator of the exact wave shape and magnitude that the full voltage impulse trace should provide on the oscilloscope and obviates the necessity of the operator comparing the test wave with a sample card having a previously recorded picture of a typical wave for the particular voltage class of transformer being tested and making the decision whether the momentary observed trace was sufficiently like the wave shape previously recorded on the card to conclude that no fault occurred in the test piece.

It is another object of the invention to provide novel means for successively initiating the discharge of a reduced voltage surge generator and a full voltage surge generator and for switching the outputs of the two generators to an impulse wave shaping circuit and the test piece in the interval between output impulses from the generators.

Another object of the invention is to provide a Marx circuit surge generator wherein all of the sparkgaps are normally open so wide that it is impossible for the generator to accidentally discharge.

These and other objects and advantages of the invention will be apparent from the following detailed description when taken in conjunction with the accompanying drawing wherein.

Figure 1:
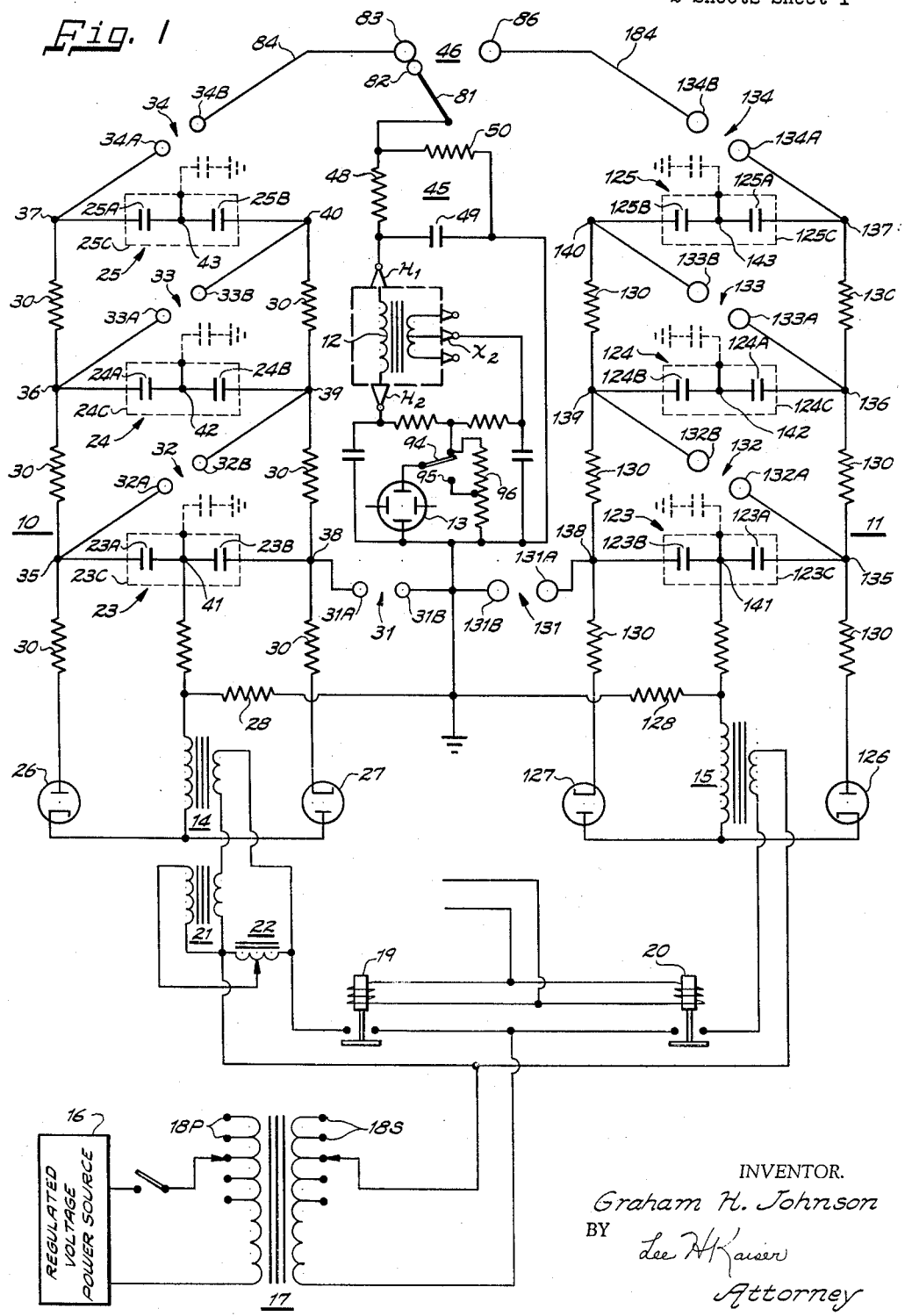
FIG. 1 is a schematic circuit diagram of the reduced voltage and full voltage surge generators of the invention.

The impulse testing apparatus schematically illustrated in FIG. 1 includes a reduced voltage, conventional Marx circuit surge generator 10 and a full voltage conventional Marx circuit surge generator 11 which are adapted to be sequentially discharged through a transformer winding 12 to be tested. As discussed hereinbefore and disclosed in my copending application, the trace of the reduced voltage impulse wave in the transformer winding 12 on the long persistence screen of an oscilloscope 13 provides a reference image of the wave shape and magnitude of the trace generated by the full voltage surge generator impulse in the winding 12 when no fault has occurred and thus permits direct visual comparison of the waves to detect a fault. The condensers 23, 24, and 25 of the reduced voltage generator 10 are charged through a step-up transformer 14 having a lower ratio of transformation than the step-up transformer 15 through which the condensers 123, 124, and 125 of the full voltage generator 11 are charged. The primaries of the transformers 14 and 15 are excited in parallel and their mutual ratios of transformation are chosen to be the same as the predetermined ratio that is desired between the amplitudes of the reduced and full voltage impulse waves. The reduced voltage wave should be of low enough potential to render a failure highly improbable in any test transformer 12. The output of a regulated voltage power supply 16 energizes the primary of a voltage selector transformer 17 preferably having taps 18S in the secondary which permit selection of voltages corresponding to the voltage classes established by industry standards and also having calibrating taps 18P in the primary. The secondary of the voltage selecting transformer 17 is connected through the normally open contacts of relays 19 and 20 respectively to the primary windings of the charging transformers 14 and 15. A calibrating "tickler" transformer 21 inserted between the contacts of relay 19 and charging transformer 14 is adjustable by means of a variable autotransformer 22 to permit "fine" adjustment of the output voltage of the reduced voltage surge generator 10. In particular, the "tickler" transformer 21 is adjusted to provide coincidence of the traces of the reduced and full voltage impulses on the long persistence screen of the oscilloscope 13 discussed above.

The elements of the reduced and full voltage surge generators 10 and 11 are as nearly identical as possible, except for the voltage rating, and only the reduced voltage Marx circuit surge generator 10 will be described in detail. The capacitors 23, 24, and 25 are charged from the output of rectifiers 26 and 27. One terminal of the secondary of step-up charging transformer 14 is held at ground potential by a resistance coupling 28, and the rectifiers 26 and 27 alternately conduct as the ungrounded terminal of the secondary of charging transformer 14 alternates between positive and negative polarity. The capacitors 23, 24, and 25 are parallel arranged in "steps" which are connected by charging resistances 30 and normally "isolated" by sparkgaps 32 and 33 connected across the "steps," and a sufficient number of capacitors are utilized to provide an output impulse of the desired voltage when the sparkgaps 31, 32, 33, and 34 are flashed over to connect the capacitors 23, 24, and 25 in series. The capacitors 23, 24, and 25 have center taps 41, 42, and 43 connected to their respective metallic casings 23c, 24c, and 25c. The condenser halves, e.g. halves 23A and 23B of condenser 23, are charged to equal and opposite potentials with the capacitor casing, e.g. 23c at ground potential. The charges accumulated on the capacitors bias the rectifiers 26 and 27 to cutoff so that the amplitude of the charging voltage wave must reach a progressively higher magnitude in order to cause the rectifiers 26 and 27 to conduct as the charge builds up on the condensers. Consequently, a considerably greater time interval is required for the capacitors to reach full voltage than that indicated by the time constant RC of resistors 30 and capacitors 23, 24, and 25. If the half cycle crest voltage output of the charging transformer 14 is assumed to be 50 kilovolts, at the end of a full charging period points 35, 36, and 37 and sparkgap electrodes 32A, 33A and 34A will be at 50 kilovolts negative with respect to ground; points 38, 39, and 40 and sparkgap electrodes 31A, 32B and 33B will be at 50 kilovolts positive with respect to ground; and center taps 41, 42, and 43 and sparkgap sphere electrodes 31B and 34B will be at ground potential.

At the instant reduced voltage generator 10 is discharged, the spacing of the sparkgaps is preferably such that the voltage across sparkgap 31 equals the critical sparkover potential, the voltage gradient across sparkgap 32 is slightly less than that at which critical sparkover voltage is obtained, the voltage gradient across sparkgap 33 is slightly less than the voltage gradient across gap 32, and the voltage gradient across gap 34 is slightly less than the voltage gradient across gap 33. It will be apparent that at the end of the charging period, the voltage across gaps 31 and 34 is approximately one-half the voltage across gap 32 and 33 and that, consequently, the spacing of gaps 32 and 33 must be greater than that of gaps 31 and 34. In other Marx circuit generators where one terminal rather than the center tap of the capacitors is held at ground potential, all of the gap spacings may be approximately equal. When sparkgap 31 flashes over, the low impedance of the arc causes point 38 to effectively assume ground potential. The terminal 35 of capacitor half 23A immediately assumes a negative potential of approximately 100 kilovolts with respect to ground, i.e. approximately equal to the terminal-to-terminal potential across condenser 23, and the casing 23c of condenser 23 and center tap 41 assume a negative potential of approximately 50 kilovolts with respect to ground. Since the capacitor 24 is coupled to capacitor 23 through charging resistances 30, the stray capacitance from the casing 24c of capacitor 24 to ground shown in dotted lines tends to instantaneously hold the casing 24c at ground potential, and consequently the entire terminal-to-terminal voltage of capacitor 23 plus the voltage of capacitor half 24B is available to sparkover gap 32. When gap 32 sparks over, the potential across gap 33 instantaneously rises above the critical sparkover potential in a similar manner, and gaps 33 and 34 fire in succession. The three capacitors 23, 24, and 25 are thus, in effect, connected in series by the ionized gaps, and the output of the reduced voltage surge generator 10 is coupled to the wave shaping circuit 45 by output switch 46 which will be described in detail hereinafter.

The series resistance 48 and the shunt capacitance 49 of the wave shaping circuit 45 delay the time-to-crest of the impulse wave from surge generator 10. The shunt resistance 50 of the wave shaping circuit 45 attenuates the generator output voltage to one-half crest amplitude in approximately forty microseconds, and the elements of the wave shaping circuit are adjusted so that the transformer winding 12 under test receives a negative polarity 1½ x 40 microsecond voltage wave.

Figure 2:
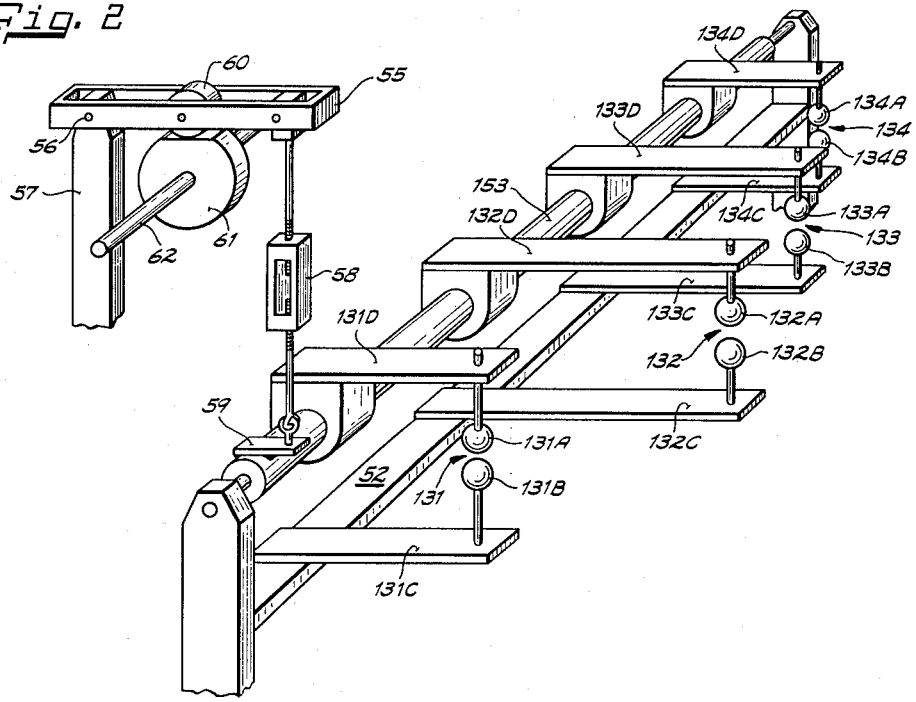
FIG. 2 is a perspective view of the sparkgap means of the full voltage surge generator of FIG. 1.

The full voltage surge generator 11 and its mode of operation are substantially identical to the reduced voltage generator 10, and the components of full voltage generator 11 similar to elements of the reduced voltage generator 10 are given the same reference numerals with the addition of 100 e.g., capacitor 123 of full voltage surge generator 11 is similar to capacitor 23 of reduced voltage generator 10. FIG. 2 illustrates the sparkgap means by which the desired potential gradients are attained in the sparkgaps 131, 132, 133, and 134 at the instant discharge of the full wave surge generator 11 is initiated. It will be appreciated that a similar sparkgap arrangement is provided for the reduced voltage generator 10.

The sparkgap sphere electrodes 131B, 132B, 133B, and 134B are preferably maintained stationary and mounted on insulating arms 131C, 132C, 133C, and 134C respectively which are rigidly affixed to a support member 52. The sparkgap sphere electrodes 131A, 132A, 133A, and 134A are mounted on insulating arms 131D, 132D, 133D, and 134D which are rigidly secured to a shaft 153 having limited angular rotation. Normally the shaft 153 is actuated to a position wherein all sparkgaps 131, 132, 133, and 134 are opened so wide that they cannot sparkover. At the instant it is desired to discharge the surge generator 11, shaft 153 is rotated to simultaneously close all of the gaps 131–134 smoothly to approximately zero gap spacing and preferably in such a manner that the ratio of gap spacings is maintained at all instants during the gap closing interval at the predetermined values required for satisfactory surge generator operation. In accordance with the method of the invention, the sparkgaps 131–134 are simultaneously closed subsequent to initiation of the charging of the capacitors 123–125. It will be apparent that the ratio of gap spacing is in direct proportion to the length of the insulating support arms 131D, 132D, 133D, and 134D for the movable gap electrodes 131A, 132A, 133A, and 134A, or more precisely to the distances from the axis of shaft 153 to the points where the sphere electrodes of the sparkgaps have the least gap spacing. The diameter of the sphere electrodes of the gaps 131–134 are preferably large in comparison to the gap spacing with the result that the voltage gradients in the gap spaces are substantially linear and the spark over potentials of the gaps are proportional to the gap spacings.

The ratio of the spacing of any one gap 131, 132, 133 and 134 to the spacing of any other gap is a constant regardless of the angular position of shaft 153. One end of a generally horizontal arm 55 is pivotally secured by a pin 56 to a vertical support 57, and the opposite end of arm 55 is secured to a turnbuckle cam coupling 58, which, in turn, engages a member 59 secured to and extending laterally of shaft 153. A cam follower 60 rotatably mounted on arm 55 intermediate the ends thereof engages a cam 61 secured to a rotatable cam shaft 62, and it will be apparent that rotation of shaft 62 and cam 61 will raise and lower arm 55, turnbuckle 58, and member 59 to rotate shaft 153 and thus vary the spacings of the gaps 131, 132, 133, and 134. Preferably the gaps are calibrated by adjusting the lower sphere electrodes 131B–134B until the uppermost portions thereof are on the level of the center of shaft 153; rotating cam 61 until the upper sphere electrodes 131A–134A are at the lowest part of their stroke; adjusting the upper gap spheres 131A–134A until they just touch the lower gap spheres; and adjusting the turnbuckle 58 until the sphere electrodes of each gap are slightly separated. Since the maximum movement of each sphere gap electrode 131A–134A is small compared to the length of the insulating arm that support its, there is negligible lateral displacement of the electrodes 131A–134A from the true vertical as the gap is open and closed. The ratio of one gap spacing to any other gap spacing is thus constant, and the gap spacing ratio between any two gaps is determined solely by the length of the radius arms 131D–134D. The gaps 131, 132, 133, and 134 are simultaneously moved toward closed position after the capacitors 123–125 are at least partially charged and when it is desired to discharge the full wave surge generator 11. During the closing stroke, critical sparkover potential is attained first by gap 131 regardless of the voltage to which the condensers of the surge generator 11 has been charged. Since the spacings of the remaining gaps are inherently held to the predetermined desired ratio, the gaps 132, 133, and 134 successively flashover as described hereinbefore.

Figure 3:
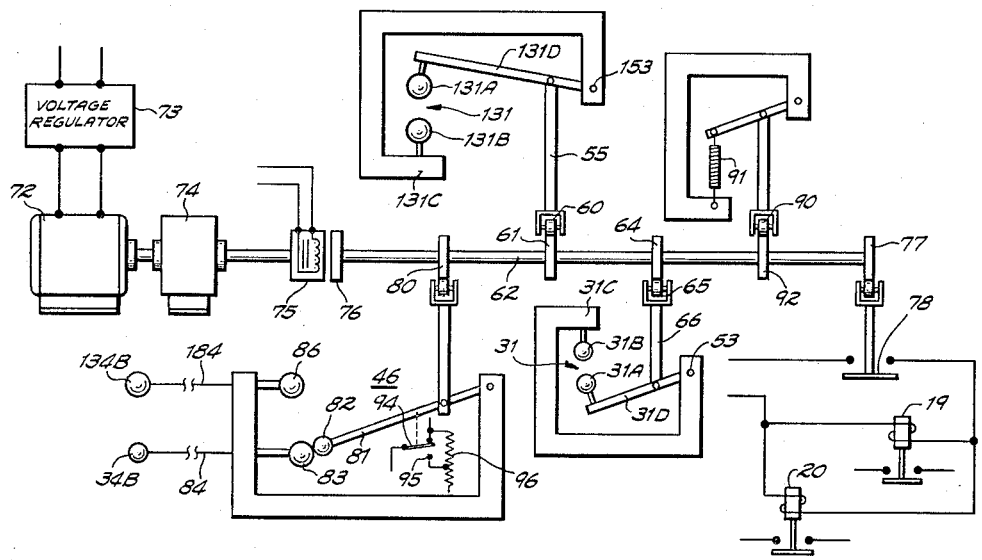
FIG. 3 is a schematic diagram of the means for actuating the sparkgap means of the reduced and full voltage surge generators to maintain constant ratio of gap spacing and to initiate sequential discharge of the surge generators.

Gap means substantially identical to that illustrated in FIG. 2 is also provided to initiate discharge of the reduced voltage surge generator 10. As shown in FIG. 3, a cam 64 on cam shaft 62 actuates a cam follower 65 which is connected through cam coupling means 66 to an arm 31D carrying gap electrode sphere 31A and rigidly affixed to a rotatable shaft 53 which carries the insulating arms 31D, 32D, 33D, and 34D on which the movable gap electrodes 31A, 32A, 33A, and 34A of the reduced voltage surge generator 10 are affixed.

Cam shaft 62 is driven by an alternating current motor 72 which is energized from a constant voltage source 73. Motor 72 through a suitable gear reducer 74 and a magnetic clutch 75 actuates a driven plate 76 affixed to cam shaft 62. The winding of magnetic clutch 75 is energized by a manually controlled switch (not shown) and causes cam shaft 62 to rotate through one revolution in a predetermined time $t$. In rotating, cam shaft 62 first actuates cam 77 to close movable contact 78 and complete an energizing circuit from a suitable power source to relays 19 and 20 in parallel, which operate to connect the voltage selector transformer 17 to the charging transformers 14 and 15 of the reduced and full wave generators.

At the beginning of rotation of cam shaft 62, cam 80 secured on shaft 62 normally holds pivoted arm 81 carrying sphere electrode 82 of the output switch 46 in engagement with a sphere electrode 83 which is connected by conductor 84 to the sphere electrode 34B of the reduced voltage generator 10. The capacitors 23, 24, and 25 of the reduced voltage generator 10 charge for a time interval $t_1$ which is less than $t$, and at the end of time interval $t_1$ cam 64 actuates shaft 53 and sphere electrodes 31A, 32A, 33A, and 34A to close gaps 31, 32, 33, and 34, which are normally maintained open, to very nearly zero setting and thus initiate the discharge of reduced voltage generator 10 through sphere electrodes 82 and 83 of output switch 46, wave shaping circuit 45, and the test transformer 12. The desired ratio of gap spacing is inherently maintained during closing of the gaps, and the sparkgaps 31, 32, 33, and 34 flashover in succession as described above. After discharge of reduced voltage surge generator 10, cam 80 actuates arm 81 and sphere electrode 82 into engagement with a sphere electrode 86 which is connected by conductor 184 to electrode 134B of the full voltage generator 11. In operating, arm 81 actuates the movable contact 94 of a voltage dividing switch into engagement with stationary contact 95 (see FIG. 1) to insert resistance 96 into the coupling circuit to oscilloscope 13 and thus under no fault conditions provide an image of the test wave on the oscilloscope screen resulting from the discharge of full voltage generator 11 having the same magnitude as the reference wave resulting from discharge of reduced voltage generator 10. At the end of a time interval $t_2$ which is longer than $t_1$ but shorter than $t$, cam 61 actuates arm 55, shaft 153, and sphere electrodes 131A–134A to close the gaps 131, 132, 133, and 134 of the full voltage generator 11 to nearly zero spacing. Regardless of the voltage to which the capacitors have been charged at the instant the gap closing stroke is initiated, at some time during the closing stroke the critical sparkover potential will be attained by sparkgap 131 by virtue of decreased spacing. Since all other gap spacings will be simultaneously of the proper ratio relative to gap 131, subsequent sparkover of the remaining gaps 132, 133, and 134 is accomplished in the manner described hereinbefore to discharge the full voltage generator 11 through output switch 46, wave shaping circuit 45, and test piece 12.

The condensers 123, 124, and 125 have not reached full charge at the end of time interval $t_2$. The rate of production line impulse testing of electrical transformers 12 is greatly increased, in comparison to the rate that could be attained if it were necessary to wait until the condensers reach full charge, by normally maintaining the gaps open and discharging the condensers by closing all of the gaps simultaneously at the expiration of predetermined time period $t_2$ after initiation of charging of the capacitors. For example, in one embodiment approximately 93 percent of full charge is attained in approximately five seconds whereas approximately thirty seconds is required to reach full charge. Further, the voltage regulated charging power source 16 in combination with the means for initiating generator discharge after the expiration of a predetermined interval and the means for maintaining constant ratio of gap spacing provides voltage impulses of accurately determined potential. It will be apparent that the impulse testing apparatus of the invention and its method of operation eliminate the necessity of recalibrating the sparkgaps whenever an output impulse of different voltage is to be delivered and that the rate of testing electrical transformers is greatly increased in comparison to prior art production line impulse testing apparatus. Further, the impulse testing apparatus of the invention permits the sequential discharge of a reduced voltage and full voltage surge generators in rapid succession through the test piece to permit display of a no-fault reference wave for the transformer undergoing test on a long persistence oscilloscope screen. Such a reference wave has the same amplitude and position on the time base as the actual test wave from the full voltage generator and provides the operator with a greatly improved opportunity for noting fault signals in comparison to prior art methods wherein the operator was required to match a complex wave form on the viewing screen with an earlier recorded reference wave. Inasmuch as both the reduced and full voltage impulses flow through the same wave shaping circuit 45, no change in the wave shape of the impulses occurs due to variation of the series resistance of the wave shaping circuit as occurred in prior art circuits.

All of the rotating elements are mounted on ball bearings and spring-compensated to minimize the required operating forces. In order to prevent backlash in the gear reducer 74 whenever a cam follower is entering a radially inward portion of the cam track, a cam follower 90 is resiliently urged by spring means 91 against a cam 92 secured to shaft 62, and the cam 92 is profiled to exert counter-torques on shaft 62 that are equal and opposite to those of the cams 61, 64, 77, and 80. Inasmuch as the ball bearings minimize friction and spring-loaded cam 92 absorbs and returns energy to shaft 62 as required, only a relatively small driving torque is required to actuate cam shaft 62.

While only a single embodiment of surge generator and the preferred method of operating a surge generator have been illustrated and described, many variations and modifications thereof will be apparent to those skilled in the art, and consequently it is intended in the appended claims to cover all such modifications and variations as fall within the true spirit and scope of the invention.

I claim:
1. In combination, a Marx circuit surge generator having capacitors connected to be charged in parallel and a plurality of sparkgaps connected to discharge said capacitors in series when said sparkgaps are flashed over, means for charging said capacitors, means for simultaneously opening and for simultaneously closing all of said sparkgaps, said last-named means normally maintaining all of said sparkgaps open, and means for actuating said capacitor charging means and for subsequently actuating said sparkgap opening and closing means in a direction to close said sparkgaps.

2. In combination, a Marx circuit surge generator having capacitors connected to be charged in parallel and a plurality of two-electrode sparkgaps connected to discharge said capacitors in series when said sparkgaps are flashed over, each of said sprakgaps including a member carrying one of said electrodes and being rotatable to vary the sparkgap spacing between said electrodes, and means including said rotatable members of all of said sparkgaps for normally maintaining all of said sparkgaps open and for simultaneously varying the spacing of the electrodes of all of said sparkgaps in a direction to close said sparkgaps, said means decreasing the electrode spacing of said sparkgaps at different rates and maintaining a predetermined ratio between said sparkgap spacings.

3. In combination, a Marx circuit surge generator having capacitors connected to be charged in parallel and a plurality of sparkgaps connected to discharge said capacitors in series when said sparkgaps are flashed over, means for charging said capacitors, means for simultaneously varying the spacings of all of said sparkgaps while maintaining a predetermined ratio between said spacings, said last-named means normally maintaining the spacing of each said sparkgaps at a value substantially greater than that which will provide the critical sparkover potential at which it is desired said sparkgap flashover, and means for actuating said sparkgap spacing-varying means in a direction to close said sparkgaps subsequent to the operation of said capacitor charging means.

4. In combination, a Marx circuit surge generator having capacitors connected to be charged in parallel and a plurality of sphere-electrode sparkgaps connected to discharge said capacitors in series when said sparkgaps are flashed over in a predetermined sequence, one sphere electrode of each sparkgap being carried on an arm which is rotatable to vary the gap spacing, the length of said arms being different and varying in accordance with said predetermined sequence, and means for simultaneously actuating all of said arms to close said sparkgaps.

5. In combination, a Marx circuit surge generator having capacitors connected to be charged in parallel and a plurality of two-electrode sparkgaps connected to discharge said capacitors in series when said sparkgaps are flashed over in a predetermined sequence, each of said sparkgaps including a member carrying one of said electrodes and being rotatable to vary the sparkgap spacing between said electrodes, means including said rotatable members of all of said sparkgaps for simultaneously varying the spacing of the electrodes of all of said sparkgaps while maintaining a predetermined ratio between said spacings, said last-named means normally maintaining all of said sparkgaps open, means for charging said capacitors, and means for actuating said capacitor-charging means and for subsequently actuating said sparkgap spacing-varying means in a direction to close said sparkgaps.

6. In combination, a Marx circuit surge generator having a plurality of condensers connected to be charged in parallel and a plurality of two-electrode sparkgaps connected to discharge said condensers in series when said sparkgaps are flashed over in a predetermined sequence, each of said sparkgaps including an insulating arm carrying one of said electrodes, a rotatable member carrying said insulating arms of all of said sparkgaps and adapted when rotated to simultaneously vary the gap spacing of all of said sparkgaps, said rotatable member normally maintaining all of said sparkgaps open and having a closed position wherein the gap spacing between the electrodes of all of said sparkgaps is a minimum, the distances from the axis of rotation of said member to the points of least gap spacing in said sparkgaps being different and varying in proportion to said predetermined sequence in which said gaps flash over, whereby the ratios of the voltage gradients in said sparkgaps vary in accordance with said distances as said member rotates said arms toward closed position and said sparkgaps attain critical sparkover potential in said predetermined sequence regardless of the voltage to which said capacitors are charged.

7. In combination, a Marx circuit surge generator having a plurality of capacitors connected to be charged in parallel and a plurality of two-electrode sparkgaps connected to discharge said capacitors in series when said sparkgaps are flashed over in a predetermined sequence, each of said sparkgaps including an insulating arm carrying one of said electrodes, means including a rotatable member carrying said insulating arms of all of said sparkgaps for simultaneously varying the sparkgap spacing of the electrodes of all of said sparkgaps while maintaining a predetermined ratio between said spacings, said rotatable member normally maintaining all of said sparkgaps open and having a closed position wherein the gap spacing between said one electrode and other electrode of all of said sparkgaps is a minimum, means including a power source for charging said capacitors, and means for actuating said capacitor-charging means and for actuating said sparkgap spacing-varying means toward said closed position a predetermined interval subsequent to the actuation of said capacitor charging means.

8. For impulse testing electrical apparatus, in combination, first and second Marx circuit surge generators each having parallel arranged capacitors and a plurality of sparkgaps connected to discharge said capacitors in series when said sparkgaps are flashed over in a predetermined sequence, means for simultaneously varying the spacing of all of the sparkgaps of said first generator while maintaining a predetermined ratio between said spacings, means for simultaneously varying the spacing of all of the sparkgaps of said second generator while maintaining a predetermined ratio between said spacings, means for charging the capacitors of said first and second generators simultaneously, switch means normally connecting the output of said first generator to said electrical apparatus and adapted when operated to disconnect the output of said first generator from, and to connect the output of said second generator to, said electrical apparatus, and means for successively operating at predetermined intervals apart said capacitor charging means, said gap spacing-varying means of said first generator, said switch means, and said gap spacing-varying means of said second generator.

9. A Marx circuit surge generator comprising, in combination, a plurality of capacitors connected to be charged in parallel and a plurality of sparkgaps connected to discharge said capacitors in series when said sparkgaps are flashed over, means for charging said capacitors, and means for normally maintaining all of said sparkgaps open and for simultaneously actuating all of said sparkgaps toward closed position after said capacitors are at least partially charged, said means decreasing the gap spacing of said sparkgaps at different rates and maintaining a predetermined ratio between said sparkgap spacings so that said sparkgaps attain that gap spacing at which flashover occurs in a predetermined sequence.

References Cited in the file of this patent

UNITED STATES PATENTS

| 1,997,064 | Lusignan | Apr. 9, 1935 |
| 2,064,630 | Rorden | Dec. 15, 1936 |
| 2,418,128 | Labin et al. | Apr. 1, 1947 |
| 2,254,836 | Boldingh | Sept. 2, 1951 |